(12) United States Patent  (10) Patent No.: US 8,191,775 B2
Hildred  (45) Date of Patent: Jun. 5, 2012

(54) GIFT CARD ACCOUNT SYSTEM AND METHODS OF A MERCHANT PROCESSING A GIFT CARD

(75) Inventor: Richard N. Hildred, Waterloo (CA)

(73) Assignee: NCR Corporation, Duluth, GA (US)

( * ) Notice: Subject to any disclaimer, the term of this patent is extended or adjusted under 35 U.S.C. 154(b) by 380 days.

(21) Appl. No.: 12/485,219

(22) Filed: Jun. 16, 2009

(65) Prior Publication Data

US 2010/0314442 A1  Dec. 16, 2010

(51) Int. Cl.
G06K 5/00 (2006.01)
G06K 15/00 (2006.01)

(52) U.S. Cl. ............ 235/380; 235/383; 705/39; 705/64

(58) Field of Classification Search .......... 235/379, 235/380, 382, 375, 383; 705/26.1, 35, 39, 705/44, 64, 67, 71
See application file for complete search history.

(56) References Cited

U.S. PATENT DOCUMENTS

| | | | | |
|---|---|---|---|---|
| 6,050,493 A * | 4/2000 | Fertig | .............................. | 235/487 |
| 6,193,155 B1 * | 2/2001 | Walker et al. | .................. | 235/381 |
| 6,224,109 B1 * | 5/2001 | Yang | ............................... | 283/77 |
| 6,473,500 B1 * | 10/2002 | Risafi et al. | .............. | 379/144.01 |
| 7,010,512 B1 * | 3/2006 | Gillin et al. | ..................... | 705/39 |
| 7,040,049 B2 * | 5/2006 | Cox et al. | ................. | 40/124.191 |
| 7,054,842 B2 * | 5/2006 | James et al. | ..................... | 705/64 |
| 7,711,620 B2 * | 5/2010 | Abifaker | ......................... | 705/35 |
| 7,975,927 B1 * | 7/2011 | Whitney | ....................... | 235/492 |
| 2004/0007618 A1 * | 1/2004 | Oram et al. | ..................... | 235/380 |
| 2006/0249570 A1 * | 11/2006 | Seifert et al. | .................. | 235/380 |
| 2007/0174164 A1 * | 7/2007 | Biffle et al. | ..................... | 705/35 |

* cited by examiner

Primary Examiner — Michael G Lee
Assistant Examiner — Suezu Ellis
(74) Attorney, Agent, or Firm — Michael Chan

(57) ABSTRACT

A gift card account system is provided for a merchant to process gift cards. The system comprises a merchant terminal for enabling a merchant to access a gift card account to (i) associate a key number with an account number of a gift card when payment is received from a gift card purchaser for purchase of the gift card, and (ii) associate payment instrument information with the key number and the account number when the purchased gift card and the payment instrument information are received from a gift card recipient so as to allow the gift card recipient to apply the gift card towards a future purchase of goods or services from the merchant without having to present the gift card again to the merchant.

6 Claims, 4 Drawing Sheets

GIFT CARD ACCOUNT SYSTEM AND METHODS OF A MERCHANT PROCESSING A GIFT CARD

BACKGROUND OF THE INVENTION

The present invention relates to gift card transactions, and is particularly directed to a gift card account system and methods of a merchant processing a gift card.

The use of a gift card by a gift card recipient purchasing goods from a merchant is known. Typically, the gift card recipient presents the gift card to the merchant during a transaction in which the gift card recipient purchases goods or services from the merchant. The total payment due for the purchase transaction is then deducted from the gift card. A drawback in using a gift card is that the gift card recipient needs to carry the gift card in his/her possession so that the gift card can be presented to the merchant during a purchase transaction. This may be cumbersome, especially if the gift card recipient has a multiple number of gift cards, since the gift card recipient would be carrying these gift cards in his/her wallet or purse.

SUMMARY OF THE INVENTION

In accordance with one embodiment of the present invention, a gift card account system is provided for a merchant to process gift cards. The system comprises a merchant terminal for enabling a merchant to access a gift card account to (i) associate a key number with an account number of a gift card when payment is received from a gift card purchaser for purchase of the gift card, and (ii) associate payment instrument information with the key number and the account number when the purchased gift card and the payment instrument information are received from a gift card recipient so as to allow the gift card recipient to apply the gift card towards a future purchase of goods or services from the merchant without having to present the gift card again to the merchant.

DETAILS OF THE INVENTION

Figure 1:
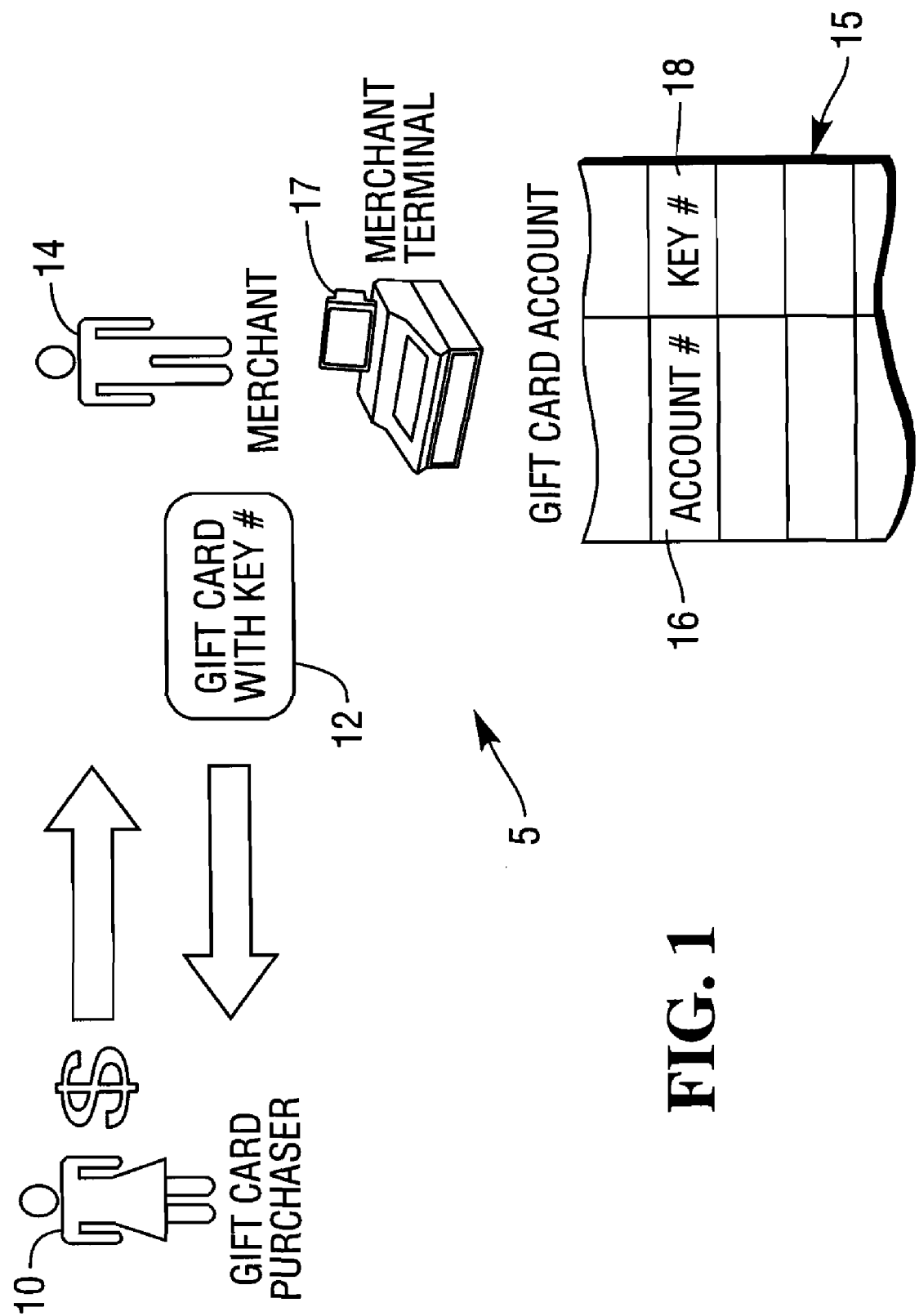
FIG. 1 is a schematic diagram of an example embodiment of a gift card account system in which a merchant is issuing a gift card to a gift card purchaser.

The present invention is directed to a gift card account system and methods of a merchant processing a gift card. One example embodiment of a gift card account system constructed in accordance with the present invention is illustrated in schematic diagram of FIG. 1, and is designated with reference numeral 5.

Figure 2:
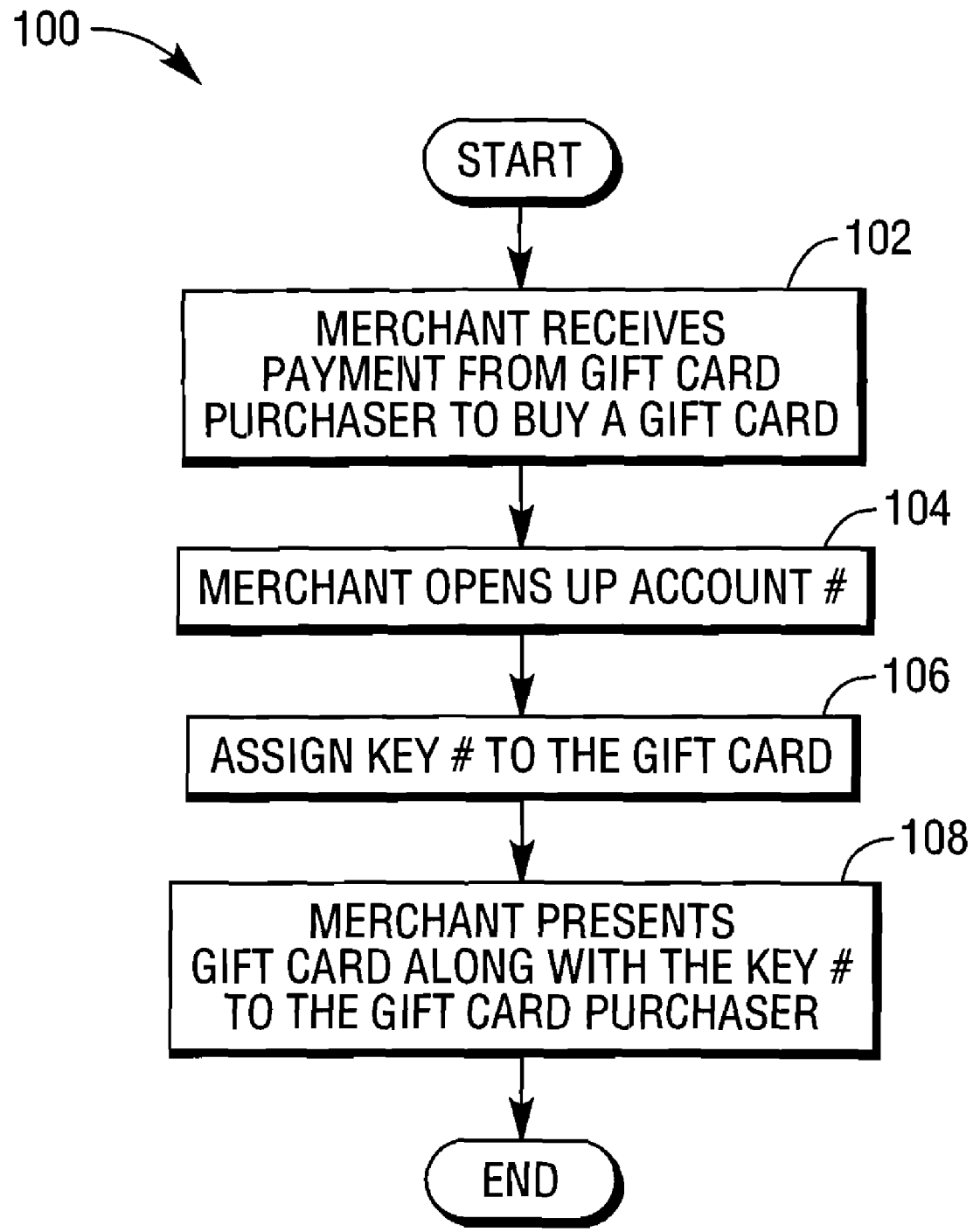
FIG. 2 is a flowchart depicting a process associated with the schematic diagram of FIG. 1.

As shown in schematic diagram of FIG. 1, a merchant 14 is issuing a gift card 12 to a gift card purchaser 10. A flowchart 100 shown in FIG. 2 depicts a process associated with the schematic diagram of FIG. 1. When the gift card purchaser 10 desires to purchase the gift card 12 from the merchant 14, the purchaser makes payment to the merchant for purchase of the gift card (step 102). The merchant 14 accesses gift card account 15 through merchant terminal 17 and opens up an account number 16 which is associated with the particular gift card 12 purchased (step 104). The merchant terminal 17 may comprise a point-of-sale (POS) terminal which is located at a fixed location.

A key number 18 is associated with the account number 16 and, therefore, also the particular gift card 12 (step 106). The key number 18 may be electronically stored with the account number 16. The merchant 14 then presents the purchased gift card 12 along with the key number 18 to the purchaser 10 (step 108). There are a number of ways in which the key number 18 can be associated with the gift card 12. The key number 18 may be disposed on the gift card 12. As an example, the key number 18 may be displayed on the gift card 12.

Figure 3:
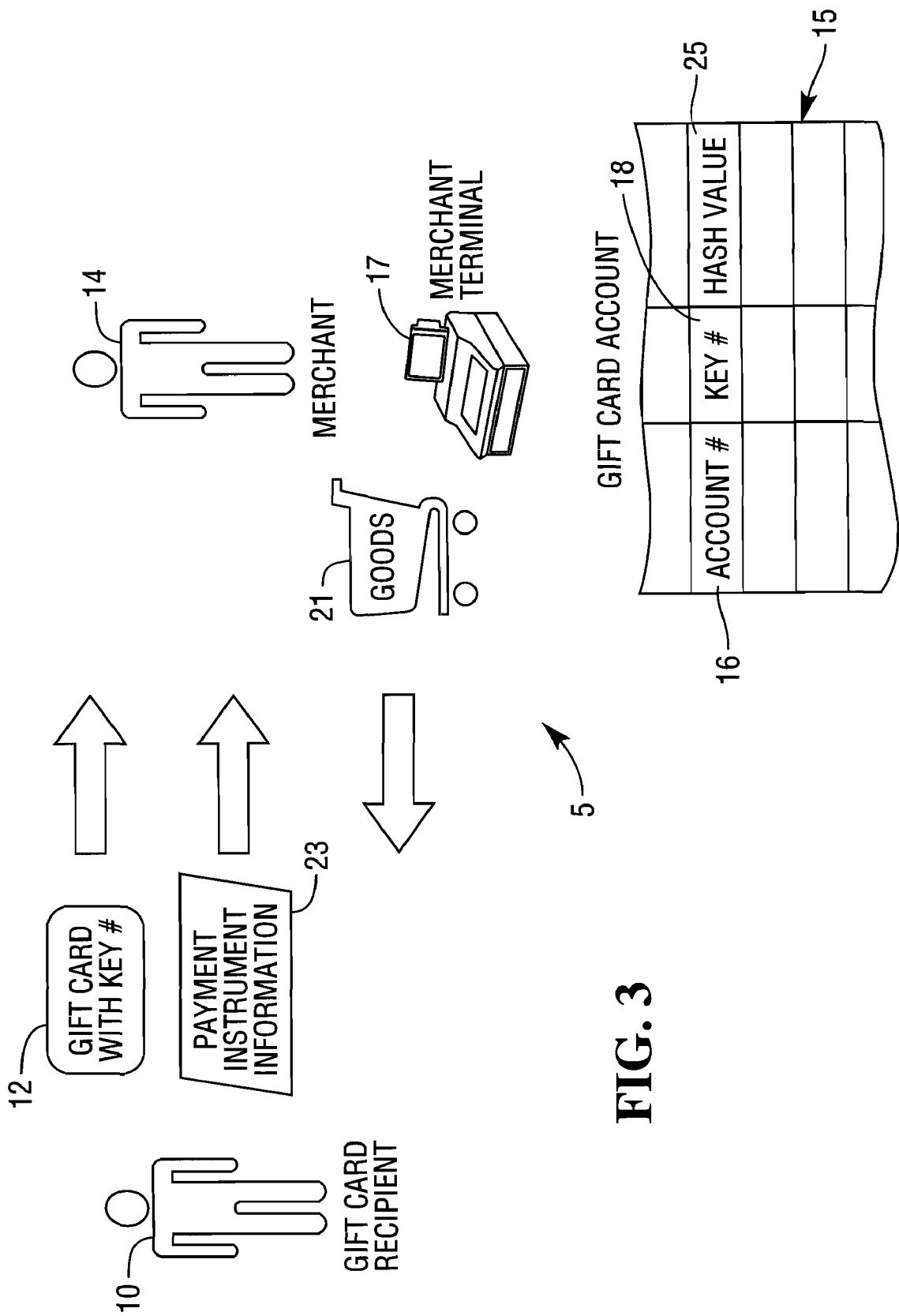
FIG. 3 is a schematic diagram of the gift card account system of FIG. 1 in which the merchant receiving from a gift card recipient the purchased gift card.
Figure 4:
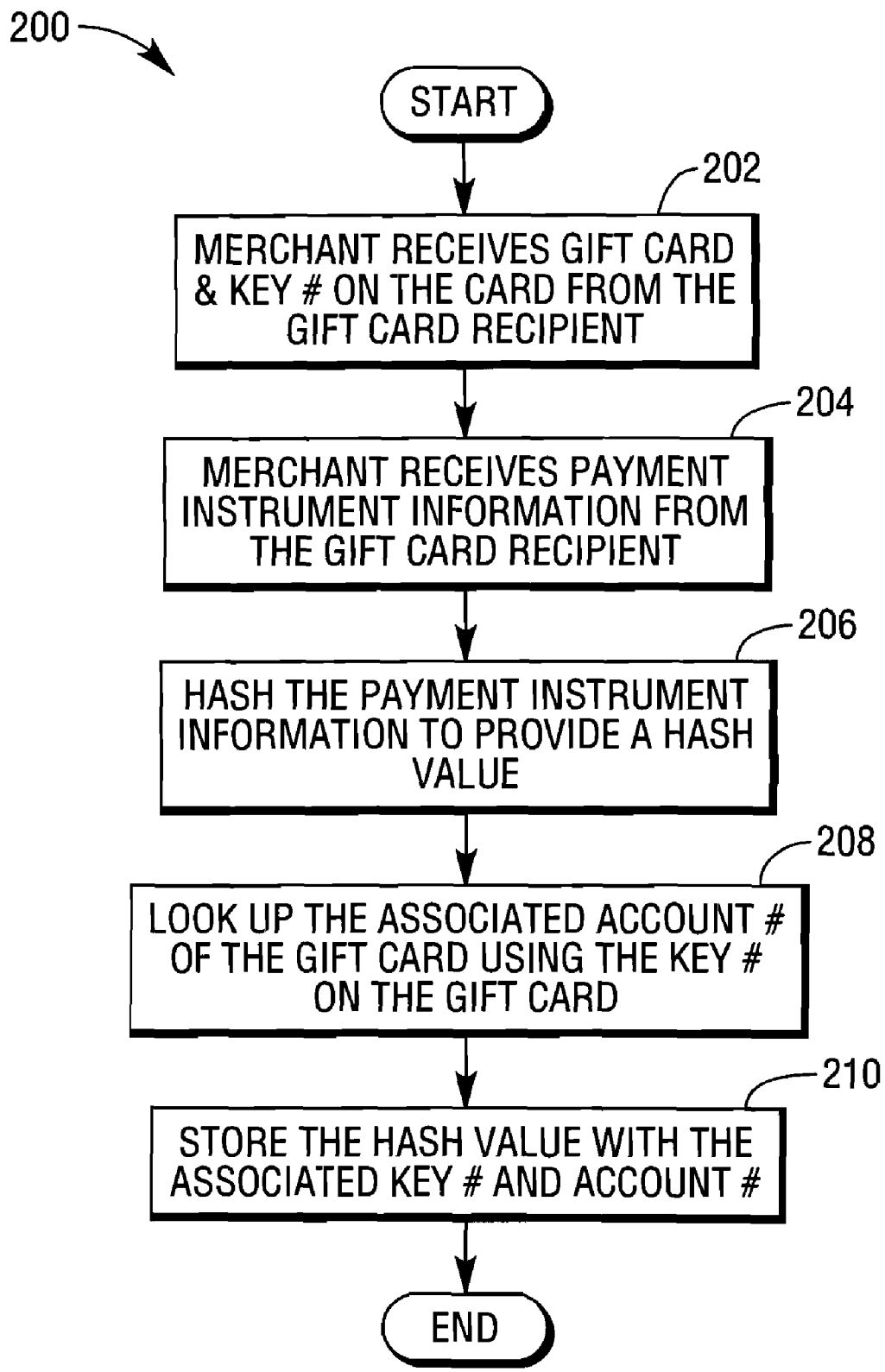
FIG. 4 is a flowchart depicting a process associated with the schematic diagram of FIG. 3.

As shown in schematic diagram of FIG. 3, the merchant 14 is receiving the gift card 12 of FIG. 1 from a gift card recipient 20 (i.e., the purchaser 10 has given the purchased gift card 12 as a gift to the recipient 20). FIG. 4 is a flowchart 200 depicting a process associated with the schematic diagram of FIG. 3. When the gift card recipient 20 desires to redeem the gift card 12 from the merchant 14 to purchase goods 21, the recipient presents the gift card 12 (which also has the key number 18 disposed thereon) to the merchant (step 202).

The recipient 20 also presents payment instrument information 23 to the merchant 14 (step 204). The payment instrument information 23 comprises information which identifies the recipient 20. As an example, the payment instrument information 23 may comprise information from a credit card associated with the recipient 20.

The merchant 14 accesses gift card account 15 through the merchant terminal 17 to enter the payment instrument information 23 which has been received from the recipient 20. The payment instrument information 23 is then hashed using a hashing algorithm to provide a hash value 25 (step 206). Numerous hashing algorithms are known and, therefore, will not be described. As an example, the hashing algorithm may be an algorithm of the type which provides a one way hash value. Then, based upon the key number 18 from the gift card 12 received from the recipient 20, the associated account number 16 is looked up in the gift card account 15 (step 208). The hash value 25 provided back in step 206 is associated with the key number 18 and the account number 16 (step 210). The hash value 25 may be electronically stored with either the key number 18 or the account number 16, or both.

A number of advantages result by providing the gift card account system 5 and method in accordance with the example embodiment of the present invention described hereinabove. One advantage is that the gift card recipient 20 is not required to have the gift card 12 in his/her possession in order to conduct a purchase transaction with the merchant 14 using the gift card. The gift card recipient 20 needs to submit the gift card 12 to the merchant 14 only once (along with the associated key number 18 and payment instrument information 23 as was described hereinabove) so that the merchant can associate the particular gift card with the particular recipient. This allows the gift card recipient 20 to apply the gift card 12 towards a future purchase of goods from the merchant 14 without having to present the gift card again to the merchant.

Another advantage is that the merchant 14 is able to know the identity of the gift card recipient 20 based upon the payment instrument information 23 provided to the merchant by the gift card recipient. Moreover, the merchant 14 is able to earn interest on the money in the gift card 12 between the time the gift card was purchased by the purchaser 10 and the time the gift card is redeemed by the recipient 20.

Still another advantage is that the payment instrument information 23 received from the gift card recipient 20 is secure since the merchant 14 is keeping only a one way hash of this information. Also, if the payment instrument information 23 should happen to become lost for some reason, the gift card recipient 20 can provide new payment instrument information to the merchant 14 to be associated with the particular gift card 12.

Although the above description describes the merchant as having a POS terminal 17 which is located at a fixed location, it is conceivable that the POS terminal may comprise some other type of terminal. For example, the POS terminal 17 may be a portable type of terminal. Also, although the above description describes the merchant 14 using a physical gift card (i.e., in paper form), it is conceivable that the merchant issue a non-physical gift card (i.e., in paperless form) to the purchaser 10 of the gift card 12. As an example, a paperless gift card may be in electronic form in which the gift card 12 along with the key number 18 is electronically transmitted to the gift card purchaser 10. Wireless technology such as infrared technology may be used. It is also conceivable that another type of wireless technology be used instead.

The particular arrangements disclosed are meant to be illustrative only and not limiting as to the scope of the invention. From the above description, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A method of a merchant processing a gift card, the method comprising:
   receiving payment from a purchaser purchasing a gift card from the merchant;
   associating an account number and a key number with the purchased gift card when payment is received from the purchaser;
   storing in a gift card account the account number and the key number associated with the purchased gift card;
   presenting the gift card and the key number to the purchaser of the gift card;
   receiving the gift card and the key number from a gift card recipient when the gift card recipient presents the gift card to the merchant;
   receiving payment instrument information from the gift card recipient when the gift card recipient presents the gift card to the merchant;
   applying a hashing algorithm to the payment instrument information received from the gift card recipient to provide a hashed value; and
   accessing the gift card account based upon the key number received from the gift card recipient to store the hashed value at a location associated with the key number and the account number of the gift card received from the gift card recipient so as to allow the gift card recipient to apply the gift card towards a future purchase of goods or services from the merchant without having to present the gift card again to the merchant.

2. A method according to claim 1, wherein the key number is disposed on the gift card when the merchant presents the gift card to the gift card purchaser.

3. A method according to claim 1, wherein the payment instrument information received from the gift card recipient comprises information from a credit card associated with the gift card recipient.

4. A method according to claim 3, wherein the hashing algorithm is of the type which provides a one way hash.

5. A method according to claim 1, wherein the gift card comprises a paper gift card.

6. A method according to claim 1, wherein the gift card comprises an electronic gift card.

* * * * *